2,820,028

PROCESS FOR THE POLYMERIZATION OF MONOMERIC VINYL HALIDE COMPOUNDS TO UNIFORM HOMOGENEOUS GRANULES

Heinrich Wenning, Marl, Westphalia, Germany, assignor to Chemische Werke Hüls Aktiengesellschaft, a corporation of Germany No Drawing. Application August 24, 1953
Serial No. 376,229

Claims priority, application Germany September 3, 1952

2 Claims. (Cl. 260—92.8)

The invention relates to a process for the production of vinyl polymerizates in the form of uniform, homogeneous granules which are suitable for use directly in machines in which they are worked up or transformed into useful articles. The process is especially applicable for the production of polymerizates of vinyl compounds of the general formula $$CH_2=CCIX$$

in which X stands for a member of the group consisting of hydrogen and chlorine. The process may be applied to a mixture of monomers to produce a mixed polymerizate.

In the course of polymerization reactions, a sequence of different conditions are encountered as the polymerization proceeds which are of decisive importance in the formation of polymerizate granules. In the early period of the polymerization in which the polymerizate is present in very small amount and the monomer is present in preponderant amount, clumps readily form which result in a more or less nonuniform polymerization due to non-uniform heating and yield polymerizates of different degrees of polymerization which melt at different temperatures. Such polymerizates have non-uniform working properties.

Different expedients have been proposed to avoid the formation of clumps. By the addition of protective colloids suspensions are obtained whose grain size is easily adjustable for instance by variation of the amount of protective colloid used; also, if desired, by the addition of emulsifiers, and by variation of the manner in which the mixture is stirred. By polymerization in water-containing solvents a finely divided polymerizate is produced without clumping but the powder is too finely divided for direct working.

According to another proposal the polymerization is carried out under simultaneous adding of monomer during polymerization at such a rate that clumping cannot occur.

It has been found that the production of polymerizate of the desired grain size and without the formation of clumps may be accomplished by carrying out the polymerization up to a maximum conversion not exceeding 25% in a homogeneous mixture of the monomer and a water-soluble organic solvent; and then adding sufficient water to cause the mixture to separate into three phases and then continuing the polymerization.

The ratio of the water soluble organic solvent to the monomer may be 3-25 parts by weight of the solvent to 100 parts by weight of the monomer. This ratio has an effect on the grain size of polymer. A ratio of much solvent and little monomer, yields fine or small granules, whereas a ratio of little solvent and much monomer yields coarse granules.

In the first stage of the polymerization in the homogeneous organic phase water may be present provided that no segregation occurs and the homogeneous organic phase is maintained. Methanol, ethanol, ethylene glycol, ethylene glycol monoalkyl ethers, polyglycols, acetone and acetic acid are examples of suitable water-soluble organic solvents.

In the first stage of the polymerization an extremely fine grained polymerizate forms which shows no tendency to aggregate so long as the conversion of 25% is not exceeded. Then in a second stage by the addition of water the system is transformed into the three phases, organic liquid, organic solid and aqueous liquid. At a volume ratio of the organic liquid to aqueous liquid of 1 to 1 the product is obtained in the form of finer or smaller granules, while at a ratio of organic liquid to aqueous liquid of 1 to 2 the product is more coarsely granular.

The grain size can therefore be also regulated by regulating the ratio of organic liquid phase to the aqueous phase in the second stage of the polymerization; much organic liquid phase giving fine granules, little organic liquid phase giving coarse granules.

The best conditions for obtaining a desired grain size by the ratio of water soluble organic solvent to monomer in the first stage and the ratio organic liquid phase to aqueous phase in the second stage may easily be found by a simple experiment.

The process may be carried out continuously or batchwise. By discontinuous operation and when the polymerization is within the range from 5% to 25%, the water necessary to cause the reaction mixture to separate into three phases may be added all at once or in a plurality of portions. The polymerization time depends substantially on the desired conversion. Generally speaking, polymerization is finished when about 50–80% of the monomer are polymerized. When working continuously, the polymerization mixture must stay a sufficiently long time in the polymerization apparatus or must flow appropriately slowly.

In continuous operation the polymerization proceeds in such a way that the monomer to be polymerized and the organic solvent with the customarily used polymerization activator are continuously introduced into a vessel and, while the polymerization is within the specified range, the resulting suspension of the polymerizate in the organic phase is drawn off into another vessel into which water is introduced simultaneously at a rate sufficient to cause the described separation into three phases. The polymerization is then continued by heating and stirring the three phases.

Before isolating the polymerizate, the monomer must be eliminated. That may be done by heating the polymerization mixture e. g. with steam. After eliminating the monomer the polymerizate may be filtered, washed and dried without danger of clumping.

Since the polymerization will be carried out, generally speaking, in the presence of a small quantity of the aqueous phase, the ordinary blade stirrer is not capable, towards the end of the polymerization, of sufficiently stirring the creamy polymerizate pulp.

Accordingly, the vessel preferably is provided with a retiform stirrer.

As activators for the polymerization the oil-soluble activators are preferred such as acyl peroxides, azo diisobutyric acid nitrile as well as compounds which decompose at the polymerization reaction tempreature with the formation of radicals. The amount of activator used does not determine the degree of polymerization. The chain length of the polymerizate depends nearly exclusively on the polymerization temperature, high temperatures yielding shorter and low temperatures longer chains. In comparison with the effect of temperature, polymerization time does not essentially vary the chain length. Choosing the right polymerization temperature, therefore, determines the quality of the polymerizate. The polymerization temperature depends on the catalyst, because the catalyst has to decompose at the polymerization temperature with a sufficient speed to offer an adequate quantity of radicals while polymerizating. On the other hand the decomposition speed is limited.

If the decomposition runs too fast, the catalyst is spent before the polymerization is finished or the monomer polymerizes so fast, that the polymerization heat cannot be removed. In this latter case it is impossible to produce an uniform polymerizate. When employing azo diisobutyric acid nitrile as a catalyst, the polymerization temperatures will be about 40–50° C. Catalysts, which decompose at higher temperatures need higher temperatures and yield polymerizates with shorter chains; catalysts, which decompose at lower temperatures, need lower temperatures and yield polymerizates with longer chains.

The quantity of the catalyst required varies between 0.1 and 3% by weight of the monomer.

The invention is further described and illustrated by the following specific example.

*Example 1*

80 parts by weight of vinylidene chloride, 20 parts by weight of vinyl chloride, 6 parts by weight of acetone, 2 parts by weight of water and 1 part by weight of azo diisobutyric acid nitrile are heated and stirred in a pressure vessel, provided with a blade stirrer, at a temperature of 50° C. for 6 hours. At the end of this time about 20% of the monomer has been polymerized. The contents of the vessel is transferred to a second vessel provided with a grid type stirrer, and 117 parts by weight of water at 50° C. are run in slowly over a period of one hour, the contents of said second vessel being continuously stirred and the polymerization is continued for 30–35 hours. The so-produced granular homogeneous polymerizate has a volume-weight (Schüttvolumen) of 150–160 ccm./100 g. and is suitable for use directly in apparatus in which it is transformed into articles of manufacture.

I claim:

1. Process for the polymerization of a monomeric vinyl compound to homogeneous, uniform granules which comprises polymerizing a vinyl compound of the general formula $$CH_2=CClX$$

in which X is a member of the group consisting of hydrogen and chlorine, in a homogeneous organic phase consisting essentially of the vinyl monomer and a water soluble organic solvent to a conversion of not more than 25%, adding water in quantity sufficient to cause the mixture to separate into three phases and continuing the polymerization.

2. Process as defined in claim 1 in which the polymerization is carried out in the presence of an activator at elevated temperature and with agitation.

References Cited in the file of this patent

UNITED STATES PATENTS

| | | |
|---|---|---|
| 2,273,891 | Pollack | Feb. 24, 1942 |
| 2,370,578 | Pollack | Feb. 27, 1945 |

FOREIGN PATENTS

| | | |
|---|---|---|
| 307,308 | Great Britain | June 4, 1930 |